July 31, 1928.

E. A. SPERRY 1,678,714

MEANS FOR PREVENTING RACING OF SHIPS' ENGINES

Filed Jan. 8, 1921

Inventor
ELMER A. SPERRY.
By his Attorney
Herbert H. Thompson

July 31, 1928.  E. A. SPERRY  1,678,714
MEANS FOR PREVENTING RACING OF SHIPS' ENGINES
Filed Jan. 8, 1921   5 Sheets-Sheet 2

Inventor
ELMER A. SPERRY
By his Attorney
Herbert H. Thompson

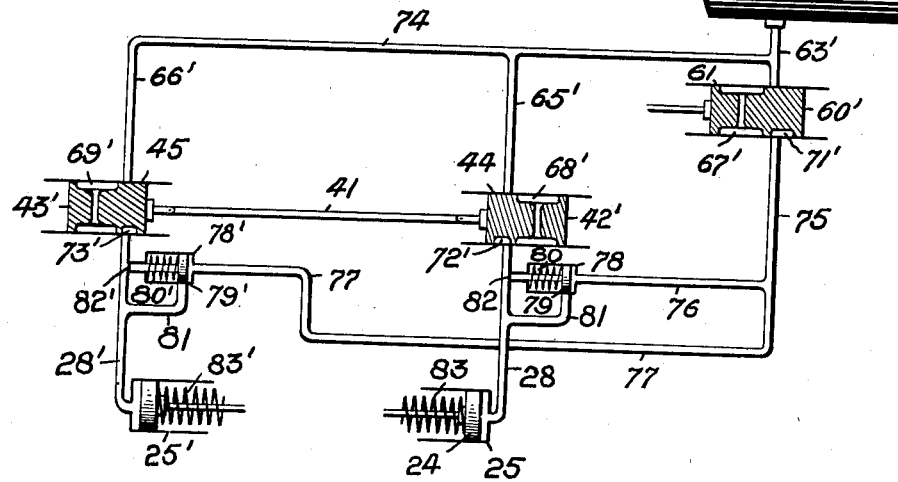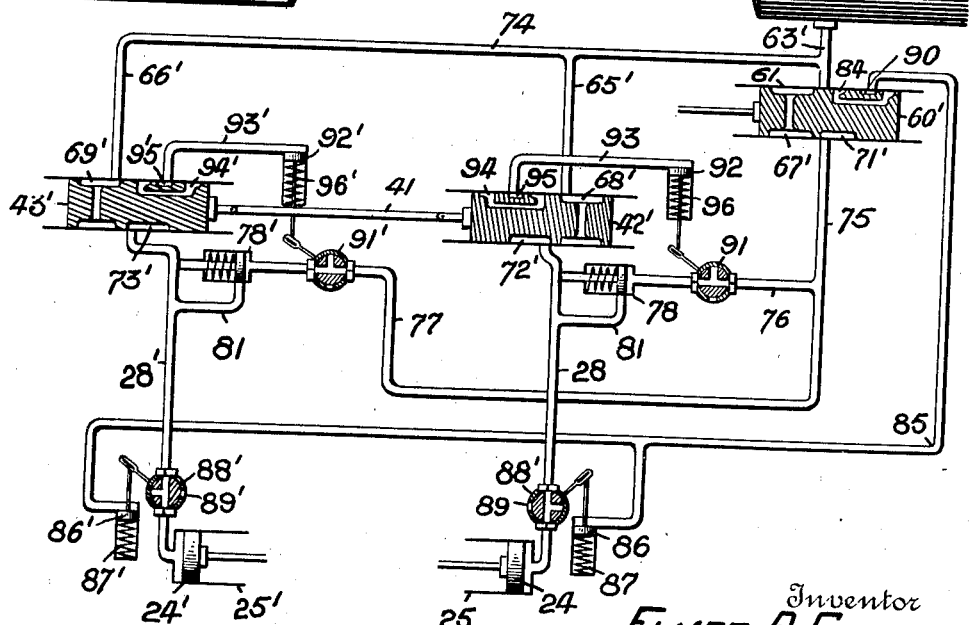

July 31, 1928.
E. A. SPERRY
1,678,714
MEANS FOR PREVENTING RACING OF SHIPS' ENGINES
Filed Jan. 8, 1921
5 Sheets-Sheet 4
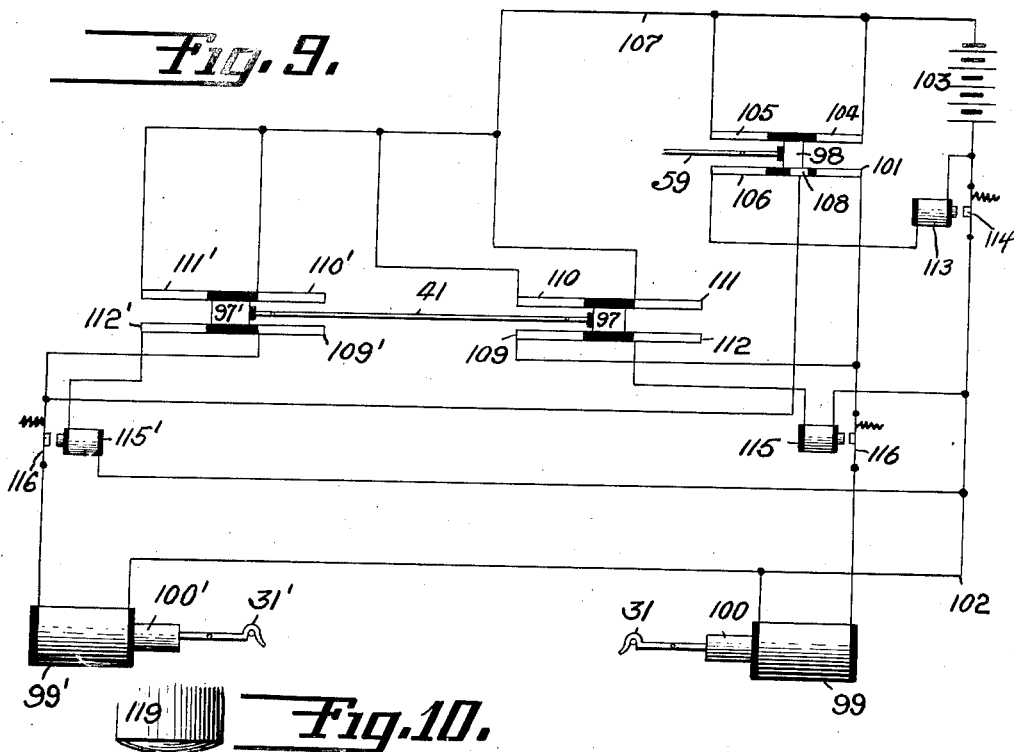
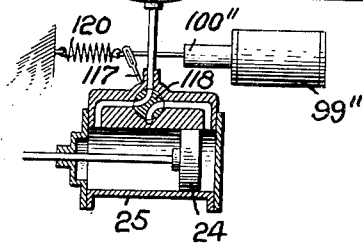
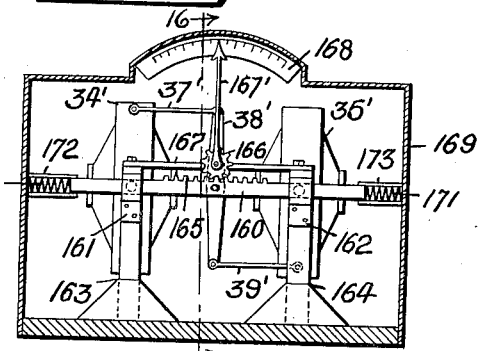
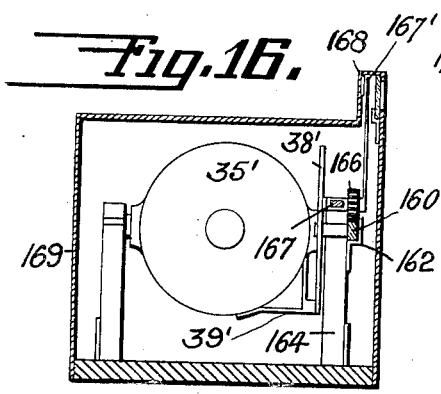
Inventor
ELMER A. SPERRY.
By his Attorney
Herbert H. Thompson July 31, 1928.
E. A. SPERRY
1,678,714
MEANS FOR PREVENTING RACING OF SHIPS' ENGINES
Filed Jan. 8, 1921   5 Sheets-Sheet 5
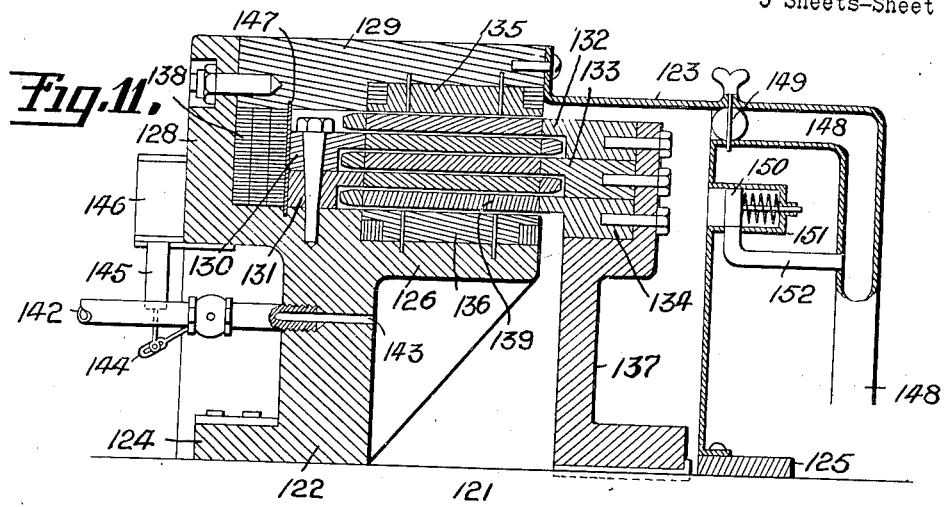
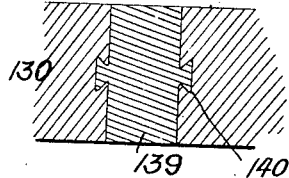
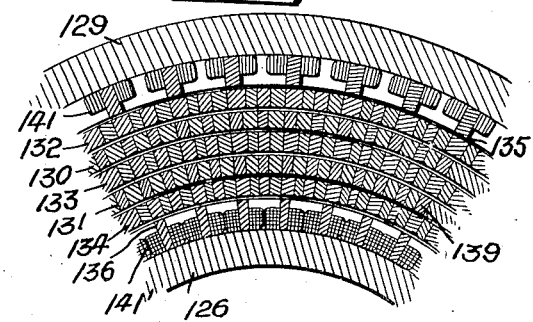
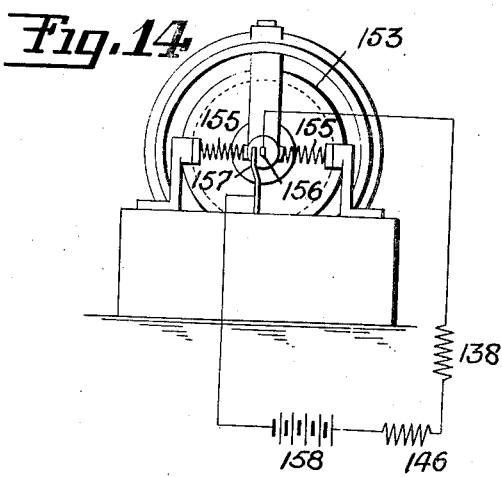
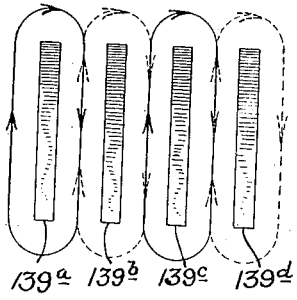
Inventor
ELMER A. SPERRY
By his Attorney
Herbert H. Thompson Patented July 31, 1928.

1,678,714

UNITED STATES PATENT OFFICE.

ELMER A. SPERRY, OF BROOKLYN, NEW YORK.

MEANS FOR PREVENTING RACING OF SHIPS' ENGINES.

Application filed January 8, 1921. Serial No. 435,837.

This invention relates to the propulsion of ships and has for one of its objects the provision of means for preventing racing of one or more of the ship's engines during rolling and pitching of the ship. If the stern of the ship pitches upwardly to such an extent that the propellers of the ship are brought out of the water it is evident that racing of the engines results. Even if the propeller is not brought above the water, racing of the engine connected thereto may result from the fact that air bubbles or cavities often surround the blades as the propeller is brought near the water's surface during pitching or rolling. By means of my invention racing of the engines upon pitching of the ship in a given direction is effectively prevented by automatically braking said engines as the ship pitches a predetermined amount in said direction. Where, as is often the case, the ship is provided with propellers on opposite sides of its longitudinal axis, it will be seen that rolling of the ship will result in moving one propeller downwardly and the other upwardly. Accordingly I have provided means whereby, when the ship is pitching in the direction aforesaid and at the same time is rolling, the braking of the engine connected to the propeller which moves downwardly on the roll is prevented.

In another form of my invention I have disclosed means for applying a brake to the engine connected to the propeller moving upwardly on the roll of the ship, even though the vessel is not pitching. In connection with this means I may also provide means for preventing the application of such braking means to either engine when the vessel pitches a given amount in a direction such as to move its stern downwardly, irrespective of whether the vessel is rolling or not.

Another object of my invention is the provision of an efficient gyroscopically controlled system for carrying out the above mentioned functions. This system includes a pair of gyroscopes rotated in opposite directions and mounted for precession in response to pitching of the ship. When the ship rolls the gyroscopes do not precess, but remain parallel to themselves, so that relative movement between the ship and gyroscopes occurs. The precession of the gyroscopes in response to pitching of the ship moves a certain control member with respect to another, whereas rolling of the ship does not result in such relative motion of said members but instead causes relative motion between another pair of control members. The latter members are not moved relatively to each other when the ship pitches. When the ship turns about a vertical axis, no relative motion between any of said members occurs. This gyroscopic arrangement for producing relative movement between a pair of members in response only to movement of the ship about a given axis may be applied to gyroscopic turn indicators for vehicles, which, as at present constructed, are influenced by turning of the vehicle about more than one axis. Consequently, a further object of my invention is the provision of an efficient turn indicator which is influenced only by the turning of the vehicle about a vertical axis.

Still another object is to provide a novel brake of the magnetic drag type, in which hydraulic means may be provided for cooling purposes and also for adding to the braking effect, so that decidedly effective means for braking the ship's propelling mechanism is obtained.

Referring to the drawings wherein I have shown what I now consider to be the preferred forms of my invention:

Fig. 7 is a diagrammatic view of a modified form of brake control system.

Fig. 8 is a view of a further modification.

Fig. 9 is a view of still another modification, wherein the control of the braking means is electrical.

Fig. 10 is a detail view of one form of brake operating means which may be used in connection with the control system of Fig. 9.

Fig. 11 is a sectional view, partly in elevation, of the upper half of my combined magnetic drag and hydraulic braking means.

Fig. 12 is a fragmentary cross section of the braking device of Fig. 11.

Fig. 12ª is a diagrammatic view illustrating the action of my improved magnetic drag braking device.

Fig. 13 is a sectional view of a modified detail.

Fig. 14 is a diagrammatic view of one form of means for controlling the operation of the brake of Fig. 12.

Fig. 15 is a side elevation of an improved form of turn indicator, the containing casing being shown in section.

Fig. 16 is a vertical sectional view on line 16—16 of Fig. 15.

Figure 1:
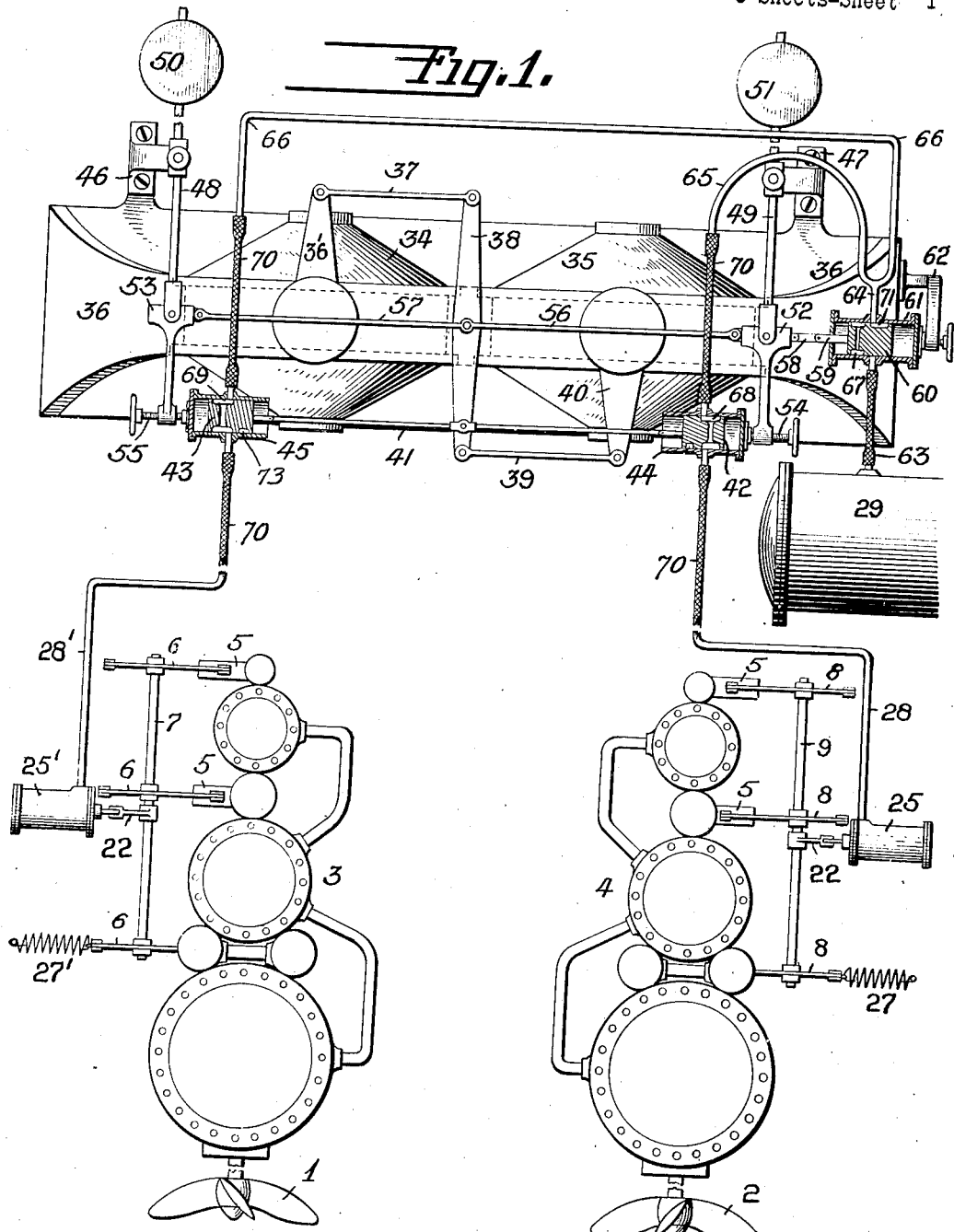
Fig. 1 is a diagrammatic view of one form of my braking system, the gyroscopic control apparatus being shown in elevation and the ship's engines and their braking means in plan.
Figure 6:
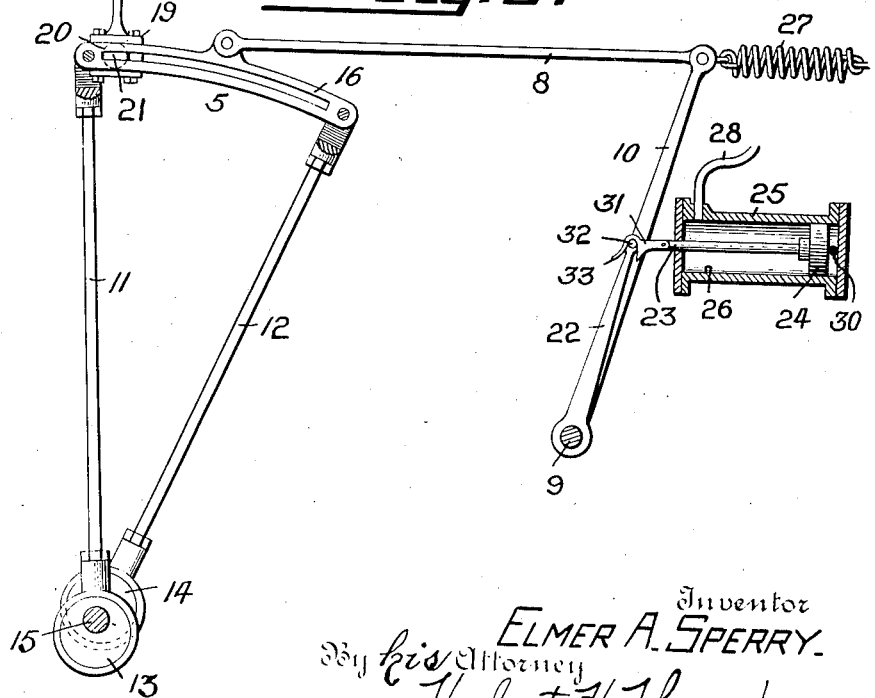
Fig. 6 is a detail view showing one form of braking means.

In Fig. 1 a pair of propellers 1 and 2 are shown, which propellers are driven by separate sources of power such as steam engines 3 and 4, respectively. The said steam engines may be of any suitable or conventional design, and each engine is shown as of the multiple expansion type comprising a plurality of cylinders, each of which cylinders is provided with the usual Stephenson valve gear 5 for regulating the speed and direction of drive of the engine. The valve gears of engine 3 may be operated simultaneously by links 6 suitably connected to a rock shaft 7. Similarly, the valve gears of engine 4 may be operated simultaneously by links 8 suitably connected to a rock shaft 9. In Fig. 6, for example, one of the valve gears 5 is shown connected by link 8 to a crank arm 10 movable with rock shaft 9. As is well understood, each valve gear 5 comprises a pair of links of the Stephenson type, one of which is shown at 16, connected to a pair of rods 11, 12, which rods are operated by cams or eccentrics 13, 14, respectively, set at angles to each other on the crank shaft 15. The valve stem 17 which controls the admission of steam from the valve chest 18 to the adjacent cylinder, as well as the exhaust of steam from said cylinder, is provided with a cross head 19 mounted between the slotted links 16. A rocking pin 20 mounted in said cross head is provided at opposite ends with keys riding in the slots of the links 16, one of which keys is shown at 21. For moving the valve gears 5 to vary the speed or direction of the engine any suitable means may be provided and since various types of such means are well known illustration thereof is unnecessary.

It will be readily understood by those skilled in the art that when the valve gear 5 is moved so that the middle of the slotted link 16 is in line with valve stem 17 the steam is trapped in the adjacent engine cylinder, the engine quickly stopped and an effective brake is provided. The valve gear in Fig. 6 is shown in such position that the maximum speed of the engine in a forward direction is obtained. For automatically moving the valve gears in response to pitching of the ship to braking position various means may be provided. One type of such means is shown in Figs. 1 and 6 and may be constructed substantially as follows:

Connected with a crank arm 22 on rock shaft 9 is the piston rod 23 of a piston 24 working in a cylinder 25. When the valve gears are set for the maximum forward speed of the engine piston 24 occupies the position shown in Fig. 6. When, however, the valve gears are to be moved to braking position, the piston is moved to the left until it strikes a suitable stop 26 in the cylinder, at which time said valve gears are in position for braking the engine. A spring 27 may be employed to bias the valve gears normally to the position shown in Fig. 6, said spring being connected at one end to one of the crank arms of rock shaft 9 and at its other end to a suitable fixed support. For moving piston 24 suitable fluid pressure means may be employed. For example, a pipe 28 may form part of the connections between the left hand end of cylinder 25 and a chamber 29 in which a vacuum is continually maintained by any suitable means. The portion of cylinder 25 at the right of piston 24 is open to the atmosphere as at 30. The connections between cylinder 25 and vacuum chamber 29 are controlled by suitable valve mechanism which will be described later in detail. It will now be evident, however, that if the said vacuum chamber is placed in communication with the cylinder 25, piston 24 will be moved to the left against the action of spring 27 and will thereupon move the valve gears 5 of engine 4 into position for braking said engine. Similar means, including a cylinder 25' and pipe 28', forming part of the connections to vacuum chamber 29, may be employed for moving the valve gears 5 of engine 3 to braking position, a spring 27' being employed to bias said gears into a position corresponding to the maximum forward speed of said engine.

For permitting the valve gears 5 to be moved into position for reversing their corresponding engine, I have shown a special form of connection between the piston rod and corresponding rock shaft. This connection is shown in detail in Fig. 6 and may take the form of a hook 31 pivotally connected to rod 23, which hook rests upon and receives a pin 32 on the crank arm 22. It will readily be seen that this hook permits movement of rod 22 and the valve gears 5 to the left in Fig. 6 even though piston 24 has reached its limit of movement against stop 26. If desired, the hook 31 may be provided with an extending lip 33 which will ride upon pin 32 as the valve gears are moved from braking to reverse position and will prevent said hook from dropping off said pin. Thus, when said gears are returned from reverse to braking position, hook 31 will drop back upon pin 32 and the connection between piston 24 and arm 22 will be automatically established. A similar connection is, of course, employed in connection with engine 3.

For controlling the communication between cylinders 25, 25' and vacuum chamber 29 the gyroscopically controlled valve system of Fig. 1 may be employed. In this figure I have shown two gyroscopes comprising rotor casings 34, 35 mounted for rotation about horizontal axes in a suitable frame 36, which frame is rigidly attached to the ship. The gyroscope rotors, not shown, are rotated in opposite directions within the rotor casings, their axes of rotation being vertical. The horizontal axes about which the gyroscopes are rotatably mounted in frame 36 are parallel to the longitudinal axis of the ship, so that upon pitching of the ship precession of said gyroscopes about said axes will occur. Connected at one end to an arm 36' rotatable with gyro casing 34 is a link 37, the other end of said link being connected to a bar or arm 38. The said bar 38 is connected at its other end to a link 39, which link is also connected to an arm 40 rotatable with gyro-casing 35 and extending oppositely to arm 36'. Adjacent its lower end, bar 38 may be pivotally connected to a rod 41, which rod in turn is pivotally connected at opposite ends to the stems of suitable valves 42 and 43. The latter are slidable within cylinders 44 and 45 respectively.

Pivoted to suitable extensions 46, 47 of frame 36 are arms 48, 49, respectively, which carry at their upper ends suitable counter-weights 50, 51. At their lower ends said arms are pivotally connected to bracket members 52, 53 which support cylinders 44, 45, respectively. Said cylinders may be adjustably supported with respect to their respective bracket members, as by means of screws 54, 55 threaded through the lower ends of said brackets and suitably connected to the end walls of said cylinders so that upon turning of the screws in their respective brackets the respective cylinders may be moved longitudinally. A link 56 connects member 52 with bar 38 and a similar link 57 serves to connect said bar 38 with member 53. Bracket member 52 may be connected through a link 58 with the rod 59 of a valve 60, which is slidably mounted in a cylindrical casing 61 adjustably supported by a bracket 62 on frame 36.

As shown, pipe 28 communicates with cylinder 44 and pipe 28' with cylinder 45. A pipe 63 leads from vacuum chamber 29 to cylinder 61. From the latter cylinder extends a pipe 64 which branches into two pipes 65 and 66, the former of which communicates with cylinder 44 and the latter with cylinder 45. A passageway 67 in valve 60 serves to open communication between pipes 63 and 64 when said valve is moved to the proper position. At other times said valve cuts off communication between said pipes. Similarly, a passage 68 in valve 42 serves to connect pipes 28 and 65 when said valve is in the proper position, while a passage 69 in valve 43 is adapted to open communication between pipes 28' and 66. When the gyroscopes and associated parts are in their normal positions, as shown in Fig. 1, valves 42 and 43 are in such positions that their passageways 68 and 69 open communication between the pipes connected to their respective cylinders.

Figure 2:
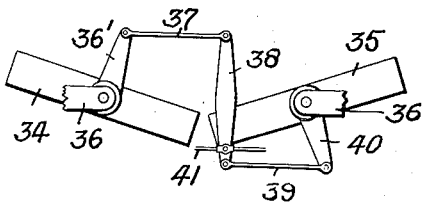
Figs. 2 and 3 are diagrammatic views illustrating the positions of the gyroscopes and certain of their connections as the ship pitches in opposite directions.
Figure 3:
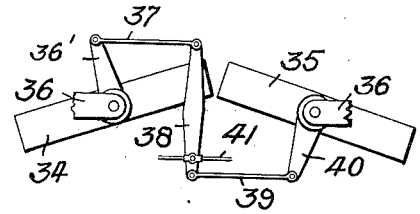

The operation of the apparatus above described is as follows: Since the rotors of the gyroscopes are of the same size and are rotated in opposite directions, said gyroscopes will precess equally in opposite directions when the ship pitches. When, for example, the ship pitches in a direction such as to move its stern upwardly, the gyroscopes precess into the positions shown in Fig. 2. As will be seen from this figure, the links 37 and 39 are moved to the right and carry with them the bar 38. Valve 60 is thereby moved to the right in cylinder 61. While valves 42 and 43 are moved to the right also by movement of bar 38 it will be seen that no movement of said valves with respect to their cylinders will take place, since said cylinders are at the same time moved by bar 38 and links 56 and 57 through the same distance as said valves. Flexible couplings 70 may be provided in pipes 28, 28', 65, and 66 adjacent said cylinders to permit such movement of the cylinders. If, now, the ship pitches in said direction to such an extent that the propellers 1 and 2 are brought above the water's surface, or to a position dangerously near such surface, valve 60 is moved to such an extent that passage 67 is brought opposite pipes 63 and 64. Now since passage 68 remains in communication with pipes 65 and 28 and passage 69 with pipes 66 and 28', it will be seen that both cylinders 25 and 25' are in communication with vacuum chamber 29. The pistons in said cylinders are thereupon moved to bring the valve gears 5 to such position as to brake the engines 3 and 4 as has been previously explained. The point in the ship's pitch at which port 67 opens communication between pipes 63 and 64 may, of course, be varied at will by suitably designing valve 60 or its connections. After the ship has reached the limit of its pitch in said direction and as it moves in the reverse direction towards its normal position the gyroscopes 34 and 35 precess oppositely in directions reverse to their previous precession and move valve 60 to the left in Fig. 1, whereupon communication between pipes 63 and 64 is again cut off and a port 71 in said valve is brought opposite pipe 64, said port being open to the atmosphere. Springs 27, 27' can thereupon return the valve gears 5 to their former positions. If the ship pitches from its normal position in a direction such as to move its stern downwardly, the gyroscopes precess as shown in Fig. 3 and move valve 60 to the left. This, however, as will readily be seen, does not place cylinders 25, 25' in communication with vacuum chamber 29 and hence the valve gears are not operated, braking of the engines being unnecessary. Due to counterweights 50 and 51, the force necessary to move brackets 52, 53 and their attached cylinders on movement of bar 38 when the ship pitches is reduced considerably.

Figure 4:
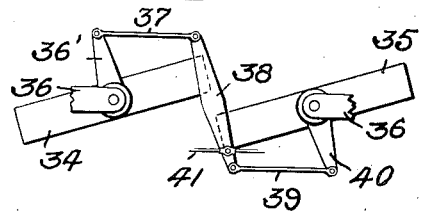

Now if the ship rolls, precession of the gyroscopes cannot occur since the gyroscopes are not free to move about a horizontal axis at right angles to their axis of precession in frame 36. The gyroscopes consequently remain parallel to themselves although the frame 36 turns about the longitudinal axis of the ship, and hence relative movement between said gyroscopes and frame results. For example, assuming that the ship rolls in a clockwise direction the gyroscopes assume with relation to frame 36 the position shown in Fig. 4. The effect of this is to shift rod 41 to the right, as will be clearly seen from Fig. 4. Valve 42 is thereby moved to the right in cylinder 44 and thereby cuts off communication between pipes 65 and 28. The braking of the engine 4, which is connected to the propeller that moves downwardly on the clockwise roll of the ship, can therefore not take place. It will, of course, be understood that propellers 1 and 2 are on opposite sides of the longitudinal axis of the ship. A further predetermined movement of valve 42 to the right in cylinder 44 brings opposite pipe 28 a port 72, which is open to the atmosphere, so that in case the valve gears connected to engine 4 had previously been moved to braking position before the roll of the ship commenced said valve gears may now be returned to their forward speed position by spring 27. Movement of rod 41 to the right does not, however, prevent the braking of engine 3, since passage 69 remains in communication with pipes 28' and 66 during such movement of valve 43, as will be seen clearly from Fig. 1. Although the gyroscopes assume with respect to the ship the position of Fig. 4 it will be apparent that no movement of valve 60 with respect to cylinder 61 occurs, since links 56 and 57 are pivoted to the central portion of arm 38, and said arm merely turns about the axis of its pivotal connection to said links.

Figure 5:
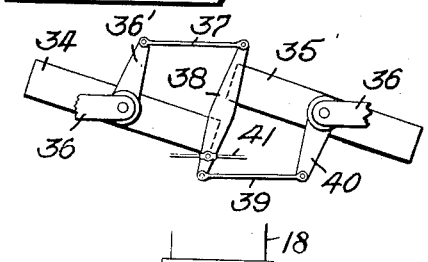
Figs. 4 and 5 are diagrammatic views illustrating the positions of said gyroscopes and connections as the ship rolls in opposite directions.

If the ship rolls counterclockwise, the gyroscopes assume with respect to frame 36 the position indicated in Fig. 5. The effect of this is to shift rod 41 to the left in Figs. 1 and 5, thereby cutting off communication between pipes 28' and 66, thus preventing the braking of engine 3. A further predetermined movement of valve 43 to the left with respect to cylinder 45 brings a port 73, which is open to the atmosphere, opposite pipe 28', thus permitting the return of the valve gears of engine 3 to their forward speed position in case they were already in braking position when the counterclockwise roll of the ship commenced. Movement of valve 42 to the left in cylinder 44 does not cut off communication between pipes 28 and 65, as will be seen from Fig. 1, and hence permits engine 4 to be braked on the counterclockwise roll of the ship. As in Fig. 4, the relative turning of the gyroscopes with respect to the ship into the position shown in Fig. 5 merely turns bar 38 about its pivotal connection to links 56, 57, and does not move said links. Hence there is no motion of valve 60 with respect to cylinder 61. It will further be apparent that since the axes of spin of the gyroscope rotors are vertical no relative movement between the gyroscopes and ship occurs when the ship turns about its vertical axis.

From the arrangement disclosed in Fig. 1 it will be seen that pitching of the ship a given amount in a direction such as to raise its stern results in braking of both engines unless the ship is rolling at the same time, whereupon the engine connected to the propeller which moves upwardly on the roll is the only one that is braked. It will be evident in this connection that the amount of roll that takes place before braking of either engine will be prevented may be varied by merely varying the design of ports 68, 69. In the system shown in Fig. 1, braking of either engine cannot occur when the ship is merely rolling unless at the same time it is pitching in the proper direction. If it is desired to apply a brake to either engine when the ship is merely rolling, regardless of whether or not it is pitching the system shown in Fig. 7 may be employed.

In the latter figure, by way of variation, I have shown a source of positive pressure 29' in place of the vacuum chamber 29, the two being equivalents so far as my invention is concerned. From pressure chamber 29' a pipe 63' extends to valve chamber or cylinder 61. A pipe 74 is connected to pipe 63' and from said pipe 74 extend pipes 65', 66' which communicate with valve cylinders 44, 45, respectively. Connected to the lower part of cylinder 61 is a pipe 75 from which extend pipes 76, 77 adapted to communicate with pipes 28, 28' respectively. The valve 60' is similar to valve 60 except that the exhaust port 71' is on its lower side instead of its upper side. Valves 42' and 43' are likewise similar to valves 42 and 43, except that in their normal position, corresponding to the position of zero roll of the ship, said valves cut off communication from the pressure source to the cylinders 25 and 25', the exhaust ports 72', 73' being at that time in register with the respective pipes 28, 28'. It will appear from the foregoing that if pipes 76, 77 were connected directly to pipes 28, 28' and the ship should pitch sufficiently to bring passage 67' in communication with pipes 63' and 75 while no rolling were taking place, the pressure from said source 29' would merely flow out from the exhaust ports 72', 73' without operating the pistons in cylinders 25, 25'. To avoid this automatic valves may be provided for cutting off communication between pipes 76, 77 and exhaust ports 72', 73' and simultaneously opening communication with cylinders 25, 25' when said pipes 76, 77 are in communication with pressure source 29'. Accordingly pipe 76 may communicate with a cylinder 78 within which slides a piston 79 normally pressed by a spring 80 into the position shown in Fig. 7. In this position said piston rests over the end of a pipe 81 which connects cylinder 78 with pipe 28. The end portion of the rod of piston 79 may be formed as a valve stem 82 which, when the piston is in the position shown in Fig. 7 is withdrawn from pipe 82 but when said piston is moved by pressure in pipe 76 is moved across pipe 28 and cuts off communication between cylinder 25 and exhaust port 72'. When pipe 76 is connected with source 29', therefore, piston 78 is moved to simultaneously open communication between pipes 76 and 28 and cut off communication between cylinder 25 and port 72'. Operation of piston 24 to move the valve gears of engine 4 to braking position results. When, on the other hand, pipe 75 registers with exhaust port 71', spring 80 returns piston 79 to its position shown in Fig. 7. A similar cylinder 78', piston 79', spring 80', pipe 81', and valve 82' may be employed in connection with pipe 77 as shown.

The operation of the system of Fig. 7 will now be apparent. If the ship rolls rod 41 is moved accordingly and upon a predetermined amount of roll one or the other of ports 68', 69' establishes communication between source 29' and the respective chamber 25, 25', whereupon the corresponding valve gear is moved to braking position. If desired, the springs 27, 27' may be replaced by springs 83, 83' in cylinders 25, 25', which springs are compressed as pistons 24, 24' are moved by the fluid pressure from source 29'. When, after rolling, the ship returns to within a predetermined distance of its normal position exhaust ports 72', 73' are brought opposite pipes 28, 28' and the piston which has been moved against its spring is restored to its original position. If the ship pitches a predetermined amount in a direction such as to raise its stern, the pipe 75 is connected with pressure source 29' and both pistons 24, 24' are operated to brake the engines 3 and 4. Pitching of the ship in the opposite direction moves valve 60' to the left and does not permit the passage of fluid to pipe 75. It may be desirable, in case the ship pitches beyond a predetermined amount in the latter direction, to prevent the operation of pistons 24, 24' by the rolling of the ship. Furthermore, it may be desirable to prevent the braking of the engine connected to a propeller which has been moved downwardly by the roll of the ship beyond a predetermined amount even though the ship be pitching so that its stern moves upwardly. For accomplishing these results the means disclosed in Fig. 8 may be employed.

The system of Fig. 8 is similar to Fig. 7 except for the addition of the means aforesaid. The valve 60' is provided with a passage 84 adapted, upon a predetermined amount of pitching of the ship so that its stern moves downwardly, to bring pressure source 29' into communication with a pipe 85, whereupon pistons 86, 86' are actuated against the action of springs 87, 87', to move three-way valves 88, 88' to such positions that cylinders 25, 25' are cut off from communication with valves 42', 43', and at the same time placed in communication with the atmosphere through ports 89, 89'. Consequently, even if the ship should be rolling sufficiently to place either of pipes 28, 28' in communication with pressure source 29', neither of pistons 24, 24' would be operated. If either of said pistons were being operated by rolling of the ship at the time that pipe 85 was connected with the pressure source said piston would be immediately returned to its original position shown in Fig. 7 when the corresponding three-way valve is operated to open communication to the atmosphere. When pipe 85 is in register with an exhaust port 90 in valve 60', as it will be when the ship is within a desired predetermined distance from its neutral position, springs 87, 87' operate their corresponding pistons to again establish communication between cylinders 25, 25' and valves 42', 43' and to cut off communication of said cylinders with the atmosphere.

Interposed in pipes 76, 77 in Fig. 8 are three-way valves 91, 91', respectively, which are connected to pistons 92, 92' for operation thereby. Piston 92 is operated when pipe 93 is connected with pipe 65' through port 94, which will happen when the ship rolls beyond a predetermined amount in a clockwise direction. The three-way valve 91 is thereby operated to cut off communication between cylinder 25 and valve 60' and simultaneously to connect said cylinder to the atmosphere. Operation of the valve gear connected to engine 4 is thereby prevented irrespective of whether the ship is pitching or not. Normally pipe 93 is in register with an exhaust port 95 so that spring 96 can return the three-way valve to its position shown. Piston 92' is operated to actuate three-way valve 91' when passage 94' connects pipes 93' and 66', while spring 96' restores valve 91' to its normal position when pipe 93' is in register with port 95'. It will hence be seen that in the system shown in Fig. 8 regardless of pitching of the vessel rolling of the vessel beyond a predetermined amount will prevent braking of the engine connected to that propeller which moves downwardly on the roll. Also, if the ship pitches beyond a given amount in a direction which moves its stern downwardly, neither engine can be braked even though the ship may be rolling.

In Fig. 9 I have shown a further modification of my invention, wherein electrical means for controlling the operation of the valve gears is employed. In this figure the valves connected to rod 41 are replaced by contact plungers 97, 97', and the valve connected to stem or rod 59 is replaced by a contact plunger 98. For operating hook 31, which actuates the valve gears of engine 4, a solenoid may be employed, to the core 100 of which solenoid said hook may be connected. Said solenoid is in circuit, as shown, with a contact 101, adapted to be engaged by plunger 98, and with a wire 102 leading to a source of E. M. F., such as a battery 103. Likewise a solenoid 99' for operating the valve gears of engine 3 is connected with wire 102 and with a contact 108 insulated from contact 101 and adapted to be engaged by plunger 98. Contacts 104, 105, and 106, insulated from each other and from contacts 101, 108, are also adapted to be engaged by plunger 98. The contacts 104 and 105 are connected to a wire 107 connected to battery 103, while contact 106 is connected to wire 102. Solenoid 99 is also in circuit with a contact 109. The latter contact and three other contacts 110, 111, 112, are adapted to be engaged by plunger 97, which plunger normally rests upon insulation between said contacts. Contacts 110 and 111 are connected to wire 107, while contact 112 is connected to wire 102. Similarly solenoid 99' is also in circuit with a contact 109', which, with three other contacts 110', 111', and 112', is adapted to be engaged by plunger 97'. The latter, like plunger 97, normally rests upon insulation between the contacts. Contacts 110' and 111' are connected to wire 107 and contact 112' to wire 102.

The operation of the arrangement shown in Fig. 9 is as follows: The normal position of plunger 98 is shown in Fig. 9. When the ship pitches a predetermined amount in such a direction that its stern moves upwardly, plunger 98 is moved to bridge contacts 108, 101, and 104 simultaneously. Thereupon current will flow through both solenoids 99 and 99', and both engines will be braked. If the ship rolls a predetermined amount in a clockwise direction, plunger 97' bridges contacts 109', 110' whether the ship is pitching or not, so that solenoid 99' is energized and engine 3 braked. Similarly, when the ship rolls a predetermined distance in a counterclockwise direction, plunger 97 bridges contacts 109, 110, independently of the pitching of the ship, and thereupon solenoid 99 is energized and engine 4 braked. If, however, the ship pitches a predetermined amount in a direction such that its stern moves downwardly, contact plunger 98 bridges contacts 105 and 106. Thereupon an electromagnet 113 is energized and attracts an armature 114 to break the connection between solenoids 99, 99' and battery 103, so that neither of said solenoids can be energized even though one or the other of plungers 97, 97' may bridge the proper contacts. If the ship rolls a given amount in a clockwise direction, which amount either may or may not be the same as the amount necessary to cause plunger 97' to bridge contacts 109', 110', plunger 97 bridges contacts 111, 112, and thereupon electromagnet 115 is energized. Armature 116, which forms part of the connection between contact 101 and solenoid 99 is thereby attracted and the connection between said solenoid and contact is thus broken. Solenoid 99 cannot now be energized even if the ship pitches a sufficient amount to bring plunger 98 between contacts 101 and 104. Such energization can occur only when magnet 115 is deenergized by the withdrawal of plunger 97 from between contacts 111, 112. If the ship rolls in a counterclockwise direction a predetermined amount, which either may or may not be the amount necessary to bring plunger 97 between contacts 109, 110, plunger 97' is caused to bridge contacts 111', 112'. Magnet 115' is thereupon energized to attract armature 116' and break the connection between solenoid 99' and contact 108 so that said solenoid cannot be energized until magnet 115' is again deenergized, even though the ship should pitch sufficiently to bring plunger 98 between contacts 104 and 108.

It is, of course, not necessary that solenoids 99, 99' operate the valve gears directly, and it will be evident that said solenoids may control the valve gears through fluid pressure means or otherwise. For example, in Fig. 10, I have shown a solenoid 99" having its core 100" connected through a suitable slotted arm 117 to a valve 118. The latter controls the admission of fluid from the source 119 to cylinder 25 wherein is located the piston 24 which operates the valve gears of engine 4. When solenoid 99″ is deenergized a spring 120 maintains valve 118 in the position shown. Upon energization of said solenoid, however, valve 118 is turned to admit fluid to the right hand side of piston 24 and to place the part of cylinder 25 to the left of said piston in communication with the atmosphere. Piston 24 is thereby moved to place the valve gears in braking position. Upon deenergization of solenoid 99′ the valve 118 is again turned to its position shown in Fig. 10, whereupon pressure is supplied to the left hand side of piston 24 and the part of cylinder 25 on the right of said piston is placed in communication with the atmosphere.

Where the ship is equipped with one or more turbines instead of steam engines the braking means which I have shown in Figs. 11 and 12 may be employed. In Fig. 11 the turbine shaft 121 is shown passing rotatably through a housing comprising members 122 and 123 bolted or otherwise secured together. Bearings 124 and 125 are provided for rotatably supporting shaft 121 in said housing. It will be understood, of course, that in Fig. 11 only the upper half of shaft 121 and housing sections 122, 123 is shown. To an outwardly extending portion 128 of member 122 is secured one end of an annular member 129 to the other end of which member the housing section 123 is attached. Secured to member 122 is a plurality of concentric annular members 130, 131 of brass or other non-magnetic material. Similar annular members 132, 133, and 134 of non-magnetic material, are secured to a member 137 keyed to shaft 121. It will be noted that the annulus 132 surrounds annulus 130, annulus 130 surrounds annulus 133, annulus 133 surrounds annulus 131, and annulus 131 surrounds annulus 134. Each annulus is provided with steel or iron inserts 139, which are shown extending in a direction parallel to the axis of the shaft 121 and are equidistantly spaced in a circumferential direction. The number of inserts on any of the annular members is equal to the number of inserts on any other member. Teeth or projections 135 of magnetic material may be provided on the under surface of member 129 and similar teeth 136, the same in number as teeth 135, may be provided on the upper surface of the annular extension 126. With this construction it will readily be seen that if magnetic flux be passed through the rotating annular members aforesaid, eddy currents will be induced in said annular members. For passing flux through the rotating annular members I have shown a magnetizing coil 138 wound concentric with said annular members and seated on member 122 between members 130, 131 and the outwardly extending member 128. It will be seen that a path for the magnetic flux is provided through members 128, 129, teeth 135, the magnetic inserts 139, teeth 136, and extension 126 back to member 128. For securely holding the inserts within their respective annular members the inserts may be provided with dovetailed projections 140, as shown in Fig. 13, and may be cast in the annular members.

If the inserts in the annular members were the same in number as the stationary projections 135 or 136, no braking effect could be produced. This is due to the fact that the eddy currents induced in the annular members would neutralize each other. Accordingly I provide a different number of inserts 139 in each annular member than there are stationary projections 135 or 136, so that one or more inserts will be passing through a zone of weak flux or no flux while other inserts are passing through stronger flux zones. With this arrangement the current induced around the teeth in the zones of weak flux will be insufficient to break up the currents flowing around the teeth in the stronger flux zones. It will, of course, be understood that the annular members aforesaid are of a material, such as brass or copper, having considerably less resistance than the steel or iron inserts 139 so that currents can be set up comparatively easily in said members. The arrangement of inserts so that the eddy currents will not neutralize each other will be understood more clearly from Fig. 12$^a$. In this figure when inserts 139$^a$ and 139$^c$ are passing through a flux zone inserts 139$^b$ and 139$^d$ are passing through zones of no flux. Currents are thereby induced in the metal surrounding inserts 139$^a$ and 139$^c$ and flow in the direction shown in full lines. If all the inserts 139$^a$—139$^d$ should pass at the same time through flux zones of equal strength currents would be induced in the metal surrounding inserts 139$^b$ and 139$^d$ which would neutralize the currents induced around inserts 139$^a$ and 139$^c$, as is indicated by the dotted lines and arrows. Inasmuch, however, as inserts 139$^b$ and 139$^d$ pass through zones of no flux at the time that inserts 139$^a$ and 139$^c$ pass through flux zones, eddy currents are free to flow about the latter as indicated. Since there are as many flux zones as there are projections 135 or 136, each of said projections constituting in effect a pole, it will be seen that as a requisite to the braking of the shaft 121 the number of inserts 139 in each annular member should be different from the number of projections 135 or 136. Preferably the number of inserts in each annular member should be a multiple of the number of said teeth. In the example shown in Fig. 12, for instance, there are twice as many inserts in each annular member as there are projections or teeth 135. It should be noted that currents will be induced not only in the movable annular members, but also in the stationary annular members 130 and 131, since flux is moved across the latter members by the inserts in the movable members. To further increase the braking torque, teeth 135 and 136 may be surrounded either by rings of copper or other low resistance material or by short-circuited coils of wire. By way of example I have shown teeth 135 surrounded by copper rings 141 and teeth 136 by short-circuited coils 141'. The copper rings 141 may be readily oxidized to such an extent as to insulate them from their supporting teeth, and coils 141' may be suitably insulated from teeth 136. As members 132 and 134 rotate it will readily be seen that the magnetic flux passing through teeth 135, 136 will pulsate and hence currents will be induced in the rings 141 and coils 141' to exert a further braking torque upon said members.

Due to the eddy currents induced in members 130—134 said members will become heated considerably. In order to effectively cool said members I prefer to circulate a cooling medium about them. Thus, in Fig. 11 is shown a pipe 142 leading from a suitable source of water under pressure and connected to a passage 143 which extends through member 122. A valve having a stem 144 suitably connected to the core 145 of a solenoid 146 serves to control the admission of the water to the passage 143. When said valve is open, water under pressure flows into the space between members 122 and 137, and circulates around the annular members 134, 131, 133, 130, and 132, passing thence into the space between member 137 and housing section 123. The coil 138 may be protected from the water by a suitable shield 147. Due to the arrangement of annular members shown a large cooling surface is provided so that the heat caused by the eddy currents may be effectively reduced to a minimum. Not only does the water aid in cooling the said annular members but it further adds to the braking effect since it offers resistance to the rotation of member 137. Outlet passages for the water may be provided at different points on the housing section 123. One of said passages is shown, for example, at 148. A suitable valve 149 may be positioned in said passage to regulate the escape of the water as desired. One or more safety valves should also be provided to permit the escape of the water in case its pressure within casing 123 should become dangerously high. One of said safety valves is shown in Fig. 11 in the form of a spring pressed piston 150 positioned in an extension 151 of housing 123 and normally closing an auxiliary passageway 152 leading to outlet pipe 148. When the pressure within housing 123 rises beyond a given amount, piston 150 is moved to the right against the action of its spring and permits the escape of water until the pressure in housing 123 is lowered sufficiently to permit said piston to close passage 152.

It will thus be seen that when coil 138 and solenoid 146 are energized a powerful braking torque is applied to shaft 121. For causing energization of said coil and solenoid in response to pitching, or pitching and rolling of the ship, various means may be provided. For example, where two turbines are provided, the magnetizing coil 138 and solenoid 146 of one turbine could obviously be substituted for solenoid 99 in Fig. 9 and the coil and solenoid of the other turbine for solenoid 99'. Another means for controlling the energization of coil 138 and solenoid 146 is shown, by way of example, in Fig. 14. In this figure, a gyroscope 153 may be mounted for rotation about an axis parallel to the longitudinal axis of the ship and for precession about a vertical axis, said gyroscope being normally centralized by a pair of springs 155. When the ship pitches a predetermined amount in a direction tending to bring its propeller above the surface of the water, a contact 156 is brought, by precession of the gyroscope, into engagement with a contact 157. The coil 138 and solenoid 146 are in circuit with said contacts and with a source of E. M. F. 158 so that a circuit is thereby closed through said solenoid and coil. Magnetic flux is thereupon passed through rotating members 132, 133, and 134, as aforesaid, and simultaneously valve stem 144 is turned to admit water to the interior of housing 122, 123, whereupon an effective brake is applied to shaft 121.

The arrangement of gyroscopes which I have disclosed in Fig. 1 is capable of general application wherever relative motion between a pair of elements is to be caused in response to movement of a support or other member about a given axis only. In Fig. 1, for example, relative motion between piston 60 and cylinder 61 occurs only when the ship pitches, and relative motion between piston 42 and cylinder 44 occurs only when the ship rolls. This principle will be found especially applicable to turn indicators, as shown in Figs. 15 and 16. When, as is the present practice, a turn indicator comprising a single gyroscope is utilized to indicate by precession the turning in azimuth of a ship or other vehicle, difficulty arises from the fact that motion of the indicator may be caused by turning of the ship about some other axis. This difficulty may be entirely overcome by the arrangement illustrated in Figs. 15 and 16.

The gyroscopes 34', 35' in Figs. 15 and 16 are shown with their spinning axes horizontal and each is mounted for precession about a horizontal axis at right angles to its spinning axis. When the ship turns in azimuth it is apparent that gyroscopes 34' and 35' will precess, and since their rotors are rotated in opposite directions precession will occur in opposite directions. A link 37' connects gyroscope 34' with one end of member 38' and a link 39' connects gyroscope 35' with the other end of said member. A bar 160 is pivoted to the center of member 38' and is slidable in suitable brackets 161, 162 attached to the gyro-supporting members 163, 164, respectively. Said bar is provided with rack teeth 165 adapted to mesh with a pinion 166 rotatably supported in a cross beam 167 supported by members 163, 164. Rotatable with said pinion 166 is a pointer 167' movable over a scale 168 which is fixed to casing 169. Springs 170, 171 may be interposed between opposite ends of bar 160 and the adjacent walls of the casing, so that when said bar is moved in one direction or the other one or the other of said springs will be compressed. Since the compression of each spring is proportional to the force of precession of the gyroscopes, which force is in turn proportional to the angular velocity of turn of the ship, the bar 160 and also pointer 167' will assume a position proportional to said velocity. Suitable housings 172, 173 may be provided for springs 170, 171.

With the structure above described it will readily be seen that when the ship turns about a vertical axis in one direction or another the gyroscopes 34' and 35' precess in opposite directions and bar 160 is thereby moved longitudinally. Pinion 166 is thereby rotated and pointer 167 moved over scale 168 to indicate the velocity of turn of the ship. Now, if the spinning axes of the gyroscopes are positioned parallel to the longitudinal axis of the ship, pitching of the ship will result in the gyroscopes 34' and 35' remaining parallel to each other in space, and in movement of casing 169 with respect to said gyroscopes. However, while relative movement between said gyroscopes and casing occurs, no movement of pointer 167 will result with respect to scale 168 since bar 38' will merely turn about the axis of the pivotal connection to bar 160 without moving said bar. If the ship rolls the relative position of the gyroscopes and casing is, of course, not changed. If the spinning axes of the gyroscopes were positioned athwartships, relative movement of the ship with respect to said gyroscopes would occur when the ship rolls, but again bar 38' would merely turn about the axis of its pivotal connection with bar 160 so that no relative movement between pointer 167 and scale 168 would occur. Pitching of the ship with the spinning axes of the gyroscopes athwartships will cause no change in the relative positions of the gyros and casing 169. It will, of course, be evident that while I have described my improved turn indicator as mounted on a ship it may equally well be mounted on an aeroplane or any other vehicle.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

In my magnetic drag braking device shown in Figs. 11 and 12 the magnetic inserts in the stationary rings 130 and 131 may, if desired, be the same in number as teeth 135 or 136. In this case, however, the braking torque would be somewhat lessened since the eddy currents induced in rings 130 and 131 would neutralize each other. The annular members 132, 133, and 134 would continue, of course, to supply considerable braking torque, as would also the short-circuited rings 141 and coils 141'. Of course, if desired, said rings and coils may be omitted and the rotatable annular members 132, 133, and 134 depended upon entirely for braking the shaft 121, but the braking torque is increased by employing said rings and coils and also by utilizing a different number of inserts in each of the stationary annular members than there are projections 135 or 136.

Having described my invention, what I claim and desire to secure by Letters Patent is:

1. In combination with a ship's propellers located on opposite sides of the longitudinal axis of the ship, separate sources of power for driving said propellers, means responsive to pitching of the ship in a given direction for braking said sources of power, and means responsive to rolling of the ship for preventing the braking of one of said sources.

2. In combination with a ship's propellers on opposite sides of the longitudinal axis of the ship, separate sources of power for driving said propellers, means responsive to rolling of said ship for braking one of said sources, and means responsive to pitching of said ship in a given direction for preventing the braking of said sources.

3. In combination with a ship's propellers on opposite sides of the longtiudinal axis of the ship, separate sources of power for driving said propellers, a pair of gyroscopes mounted for precession in response to pitching of said ship, means controlled by said gyroscopes for braking said power sources when the ship pitches in a given direction, and means for preventing the braking of one of said sources upon a given roll of the ship.

4. In combination with a ship, a plurality of propellers on opposite sides of the ship's longitudinal axis, separate sources of power for driving said propellers, and gyroscopic means responsive only to such rolling of said ship as will cause racing of either of said driving means for stopping the respective source of power.

5. In the combination specified in claim 4, means responsive to pitching of the ship in one direction for stopping said sources of power.

6. In the combination specified in claim 5, means responsive to pitching of the ship in one direction for stopping said sources of power, means responsive to a predetermined roll of the ship in a given direction for preventing stopping of one of the power sources.

7. In the combination specified in claim 4, means responsive to a predetermined pitch of the ship in a given direction for preventing stopping of said power sources.

8. In combination with a ship's propellers, separate power sources for driving said propellers, means responsive to pitching of the ship in a given direction for braking said sources, and means responsive to a predetermined roll of said ship for selectively preventing the braking of one of said sources.

9. In combination with a ship, propelling means therefor, means for braking said propelling means, means for cooling said braking means, and means for bringing both the aforesaid means into action in response to a given rocking motion of the ship.

10. In combination with propelling means for a ship, magnetic drag means for braking said propelling means, and gyroscopic means for controlling said drag means.

11. In combination with propelling means for a ship, a plurality of magnetic teeth secured to said means, a plurality of relatively fixed magnetic teeth adjacent said first mentioned teeth. means for passing magnetic flux through said teeth and means responsive to predetermined movements of the ship for controlling said last mentioned means.

12. In combination with a ship subject to rolling and pitching, a propeller, driving means therefor, a control device for said means, and gyroscopic means for imparting motion to said device responsive only to such rolling movements of the ship as cause racing of said driving means.

13. The combination with a pair of oppositely rotated gyroscopes, a support therefor, means connecting said gyroscopes for opposite precession, a control device actuated by said opposite precession, and a second control device actuated by relative movement of the support with respect to both gyroscopes.

14. The combination with a pair of oppositely rotated gyroscopes, a support therefor, means connecting said gyroscopes for opposite precession, an indicator rotated by said opposite precession and means including a member moved by relative movement of said support and both gyroscopes for preventing apparent rotation of said indicator by such movement of the support.

15. In combination with a ship having a plurality of propellers, a brake means for each propeller and a control device for said brake means, a frame, a pair of gyroscopes mounted in said frame and adapted to be oppositely rotated whereby oscillation of said frame about one axis causes opposite precession of said gyroscopes and oscillation of said frame about an axis at substantially right angles thereto causes both gyroscopes to move in the same direction with respect to said frame, and means whereby opposite movement of said gyroscopes actuates said control device to render both brake means effective and movement of said gyroscopes in the same direction actuates said control device to render one of said brake means effective.

16. In combination with a ship having a plurality of propellers, a brake means for each propeller and a control device for said brake means, a frame, a pair of gyroscopes mounted in said frame and adapted to be oppositely rotated, said frame being so mounted with respect to the ship that pitching thereof causes opposite movement of said gyroscopes, while rolling thereof causes movement of said gyroscopes in the same direction with respect to said frame, means whereby opposite movement of said gyroscopes actuates said control device to render both brake means effective and movement of said gyroscopes in the same direction actuates said control device to energize the brake means of the rising propeller, and means whereby said control device is actuated in accordance with the differential of combined opposite and similar movements of said gyroscopes.

In testimony whereof I have affixed my signature.

ELMER A. SPERRY.